United States Patent
Yu et al.

(10) Patent No.: US 8,255,655 B2
(45) Date of Patent: Aug. 28, 2012

(54) AUTHENTICATION AND SECURING OF WRITE-ONCE, READ-MANY (WORM) MEMORY DEVICES

(75) Inventors: Samuel Y. Yu, San Francisco, CA (US); Christopher S. Moore, San Jose, CA (US); Jason S. Whetstone, Pleasanton, CA (US); Ron Barzilai, Sunnyvale, CA (US); Hironaga Ino, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 325 days.

(21) Appl. No.: 12/572,991

(22) Filed: Oct. 2, 2009

(65) Prior Publication Data

US 2011/0082966 A1 Apr. 7, 2011

(51) Int. Cl.
*G06F 12/00* (2006.01)
(52) U.S. Cl. ............................................ 711/163
(58) Field of Classification Search .................. None
See application file for complete search history.

(56) References Cited

U.S. PATENT DOCUMENTS

| | | | |
|---|---|---|---|
| 5,404,485 A | 4/1995 | Ban | |
| 6,014,745 A | 1/2000 | Ashe | |
| 6,034,882 A | 3/2000 | Johnson et al. | |
| 6,182,188 B1 | 1/2001 | Hasbun et al. | |
| 6,424,581 B1 | 7/2002 | Bosch et al. | |
| 6,545,891 B1 | 4/2003 | Tringali et al. | |
| 6,763,424 B2 | 7/2004 | Conley | |
| 6,895,490 B1 | 5/2005 | Moore et al. | |
| 6,941,403 B2 | 9/2005 | Cedar et al. | |
| 6,968,459 B1 | 11/2005 | Morgan et al. | |
| 7,000,063 B2 | 2/2006 | Friedman et al. | |
| 7,139,864 B2 | 11/2006 | Bennett et al. | |
| 7,188,228 B1 | 3/2007 | Chang et al. | |
| 7,747,661 B2 * | 6/2010 | Hsu et al. ...................... 707/821 |
| 2006/0047920 A1 | 3/2006 | Moore et al. | |
| 2006/0179328 A1 | 8/2006 | Lii | |
| 2006/0242064 A1 | 10/2006 | Jogand-Coulomb et al. | |
| 2007/0094468 A1 | 4/2007 | Haustein et al. | |
| 2007/0094470 A1 | 4/2007 | Haustein et al. | |
| 2008/0010685 A1 | 1/2008 | Holtzman et al. | |
| 2009/0010117 A1 | 1/2009 | Kobayashi et al. | |
| 2009/0043963 A1 | 2/2009 | Lahcanski et al. | |
| 2009/0172321 A1 | 7/2009 | Scheuerlein et al. | |
| 2010/0017558 A1 | 1/2010 | Fruin et al. | |
| 2010/0017559 A1 | 1/2010 | Fruin et al. | |

OTHER PUBLICATIONS

Office Action for U.S. Appl. No. 12/421,229, dated Aug. 9, 2011, 28 pages.
Office Action for U.S. Appl. No. 12/421,238, dated Jul. 21, 2011, 13 pages.

(Continued)

*Primary Examiner* — Hiep Nguyen
(74) *Attorney, Agent, or Firm* — Brinks Hofer Gilson & Lione (57) ABSTRACT

These embodiments relate to authentication and securing of write-once, read-many (WORM) memory devices. In one embodiment, a memory device comprises a controller operable in first and second modes of operation after stored security information is validated, wherein in the first mode of operation, the memory device operates in a read-only mode, and wherein in the second mode of operation, the memory device operates in a write-once, read-many (WORM) mode. In another embodiment, the controller is operative to perform security methods.

27 Claims, 9 Drawing Sheets

OTHER PUBLICATIONS

"One-Time Programmable (OTP) Memory Device and Methods for Use Therewith," U.S. Appl. No. 12/421,229, filed Apr. 9, 2009, inventors: Matt Fruin, Christopher S. Moore, and Samuel Y. Yu.

"One-Time Programmable (OTP) and Write-Once Read-Many (WORM) Memory Devices and Methods for Use Therewith," U.S. Appl. No. 12/421,238, filed Apr. 9, 2009, inventors: Matt Fruin, Christopher S. Moore, and Samuel Y. Yu.

Invitation to Pay Fees for PCT/US2010/049141, dated Jan. 28, 2011, 5 pages.

International Search Report and Written Opinion for PCT/US2010/049141, dated May 16, 2011, 15 pages.

Office Action for U.S. Appl. No. 12/421,229, dated Apr. 30, 2012, 21 pages.

* cited by examiner

AUTHENTICATION AND SECURING OF WRITE-ONCE, READ-MANY (WORM) MEMORY DEVICES

BACKGROUND

Portable memory devices, such as memory cards, are often used with consumer electronic devices, such as digital cameras, mobile phones, and personal computers (PCs), to store and/or transport data. In addition to a storage medium, many portable memory devices contain circuitry, such as a microprocessor or controller, that can transform logical addresses received from the host device to physical addresses used by the memory device, thereby allowing the circuitry on the memory device to control where data is stored in the storage medium.

Many memory devices use a rewritable memory, which allows a memory address to be erased and rewritten for system or user purposes. However, other memory devices use a one-time programmable (OTP) memory array. In an OTP memory array, once a memory cell at a memory address is changed to a programmed state, it cannot be changed back to its original, unprogrammed state. Because of this limitation on the number of times a memory address can be written, memory devices with OTP memory arrays may not be compatible with host devices that use the popular DOS FAT file system or other file systems that expect to be able to rewrite to a memory address. A similar problem occurs, to a lesser extent, with memory devices that use a few-time programmable (FTP) memory array, whose memory cells can be written more than once but not as many times as memory cells in a rewritable memory array.

Another type of memory device is a write-once, read-many (WORM) memory device. This memory device is not rewritable, so that data, once written, cannot be later changed, erased, or overwritten. This is useful for applications where data reliability and security are paramount, such as archival document storage or permanent record-keeping.

DETAILED DESCRIPTION OF THE PRESENTLY PREFERRED EMBODIMENTS

By way of introduction, the following embodiments relate generally to providing compatibility between a memory device that uses a one-time programmable (OTP) (or few-time programmable (FTP)) memory array and host devices that use a file system, such as the DOS FAT file system, that expects to be able to rewrite to a memory address in the memory device. An OTP memory is a memory in which memory cells are fabricated in an initial, un-programmed digital state and can be switched to an alternative, programmed digital state at a time after fabrication. For example, the original, un-programmed digital state can be identified as the Logic 1 (or Logic 0) state, and the programmed digital state can be identified as the Logic 0 (or Logic 1) state. Because the memory cells are OTP, an original, un-programmed digital state of a storage location (e.g., the Logic 1 state) cannot be restored once switched to a programmed digital state (e.g., the Logic 0 state). In contrast, an FTP memory is a memory in which memory cells can be written to more than once but not as many times as a typical rewritable (or write-many) memory array.

Many techniques can be used to make a OTP memory device compatible with a rewritable file system of a host device. In one technique, the memory device is configured to behave exactly the same as a standard flash rewritable memory device until the memory is fully consumed, at which point the memory device would stop performing write operations. Until the memory is consumed, the memory device is essentially indistinguishable from a normal rewritable memory device. In this way, such a memory device would be backwards-compatible with existing host applications and devices. U.S. Patent Application Publication No. US 2006/0047920 and U.S. Pat. No. 6,895,490, which are both hereby incorporated by reference, provide further details on backwards-compatible memory devices. However, for certain hosts and certain host behaviors, there may be a danger of corner cases where the host might attempt to write data to the memory device, but the memory device would run out of memory and not be able to store the data (a typical example would be a digital camera attempting to store a picture on a memory card). In the worst case, the host device would not even realize the write had failed and would give no indication to the user that there was a problem.

To avoid this risk (and the accompanying negative end-user perception), the following embodiments provide a memory device that leverages the existing definition of a read-only memory (ROM) card type, provide read compatibility with existing host devices (such as existing SecureDigital (SD) host devices), and minimize the effort to modify host devices to write to an OTP memory device. In one presently preferred embodiment, the memory device takes the form of an SD memory card, based on OTP memory, that operates in accordance with a formal OTP card type specification set forth by the SecureDigital (SD) Association. Various features of these embodiments include, but are not limited to, the following:

A memory device that powers up in a read-only memory (ROM) mode to be compatible with existing specifications and readable in existing SD-compliant host devices.

A memory device that implements a new function (using a protocol defined in the SD specifications) to switch the memory device into a read/write (R/W) mode. When in R/W mode, the memory device generally behaves like a standard rewritable (e.g., flash) card, so minimal changes are needed for host devices to implement support for the OTP card.

Because, unlike a rewritable memory, an OTP memory is finite and can be fully consumed, in one embodiment, the memory card defines a new command (preferably compliant with the definition in the SD specifications) for the host device to track physical memory consumption.

Additional modifications for operations that program registers due to the limitations of OTP memory (as compared to rewritable memory) are also provided.

Figure 1:
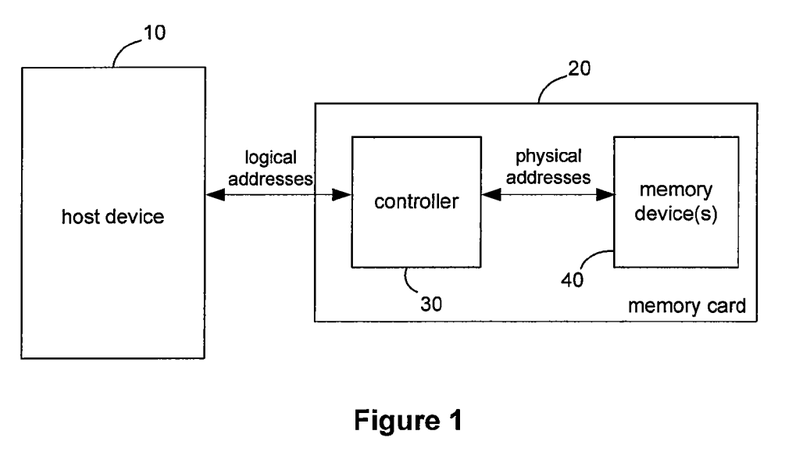
FIG. 1 is an illustration of a host device in communication with a memory device of an embodiment.

Turning now to the drawings, FIG. 1 is an illustration of a host device 10 in communication with a memory card 20 of an embodiment. As used herein, the phrase "in communication with" means in direct communication with or in indirect communication with through one or more components, which may or may not be shown or described herein. In this particular illustration, the host device 10 is in communication with the memory card 20 via mating ports. It should be noted that although a memory card 20 is being used for illustration in FIG. 1, a memory card 20 is just one example of a memory device that can be used with these embodiment. In general, a "memory device" can take any suitable form, such as, but not limited to, a memory card, a Universal Serial Bus (USB) device, and a hard drive. In one presently preferred embodiment, the memory device takes the form of a solid-state memory card, such as a SecureDigital (SD) memory card.

As shown in FIG. 1, in this embodiment, the memory card 20 comprises a controller 30 in communication with one or more memory devices 40. The memory device(s) 40 can comprise any suitable type of memory, such as, but not limited to, solid state, optical, and magnetic memory. In one embodiment, at least some of the memory device(s) 40 comprise OTP and/or FTP memory. In the event that multiple memory devices 40 are used, it should be understood that the various memory devices can each use the same or different memory technologies (e.g., (i) all OTP, (ii) OTP and FTP, or (iii) OTP, FTP, and rewritable). Preferably, the memory device 40 comprises a field-programmable solid-state memory array. The memory cells in the memory array can be organized in a two-dimensional or three-dimensional fashion. In one preferred embodiment, the memory array is a three-dimensional array, such as an array described in U.S. Pat. No. 6,034,882 to Johnson et al., which is hereby incorporated by reference. It should be noted that with reference to FIG. 1 only, the term "memory device" refers to the memory die itself. In other instances of this document, "memory device" refers more generally to the overall device (such as a memory card) that includes the memory die and other components (such as a controller, input/output ports, etc.).

The controller 30 is operative to perform various functions, some of which are described below. While a controller 30 is shown in FIG. 1, it should be understood that the memory card 20 can comprise any suitable circuitry 130. As used herein, "circuitry" can include one or more components and be a pure hardware implementation and/or a combined hardware/software (or firmware) implementation. Accordingly, "circuitry" can take the form of one or more of a controller, microprocessor, or processor that executes computer-readable program code (e.g., software or firmware stored in the memory device(s) 40, logic gates, switches, an application specific integrated circuit (ASIC), a programmable logic controller, and an embedded microcontroller, for example.

Also, a "host device" refers to any device that can be put in communication with a memory device and be used to store data in the memory device and/or read data from the memory device. Examples of host devices include, but are not limited to, consumer electronic devices such as mobile phones, digital media players, digital cameras, game devices, personal computers (e.g., desktop or portable (such as laptop or notebook) computers), email and/or text messaging devices, and personal digital assistants (PDAs). A host device can be a relatively mobile device (such as a mobile phone) or a relatively stationary device (such as a desktop personal computer).

In this embodiment, the OTP memory card 20 implements two modes of operation. In the first mode, the memory card 120 powers up in a configuration compatible with an existing ROM card definition already defined in the SD specifications (and, therefore, supported by compliant SD host devices). In the second mode, the memory card 20 is switched into a writable mode before accepting and performing writes. (A suitable ROM card configuration and behavior are described in the SD Part 1 Physical Layer Specifications v2.00, as well as in the Part 1 Physical Layer Specification version 2.00 Supplementary Notes version 1.00. The switch command protocol was defined in the SD specifications for the general situation of enabling expanded or additional features for an SD card (see section 4.3.10 of the SD Part 1 Physical Layer Specification, version 2.00.).) By powering up in a read-only mode that is compatible with an existing card definition, existing host devices can still read from the memory card 20 but cannot write to the memory card 20, providing read compatibility with existing host devices but avoiding the dangers that those non-enabled host devices will write to the memory card 20 and run into the problematic corner case discussed above.

Figure 2:
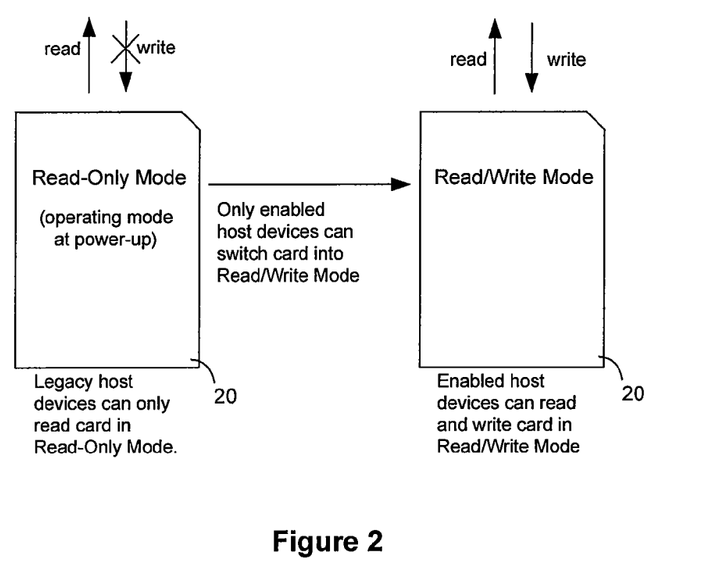
FIG. 2 is an illustration of a dual-mode behavior of a memory device of an embodiment.

Because, in this embodiment, host devices must issue a command to switch the memory card 20 into a writable mode, only host devices that have been enabled to work with the OTP memory card 20 and understand its unique features will be able to write to it. FIG. 2 illustrates the memory card's 20 dual-mode behavior. The left-hand illustration in FIG. 2 shows that (1) the memory card 20 powers up in a read-only mode so legacy host devices can only read from the card 20, (2) only enabled host devices know how to switch the card 20 into a read/write mode, and (3) in read/write mode, enabled host devices can both read and write to the card 20.

In its writable mode, the memory card 20 behaves similarly to a "normal" flash rewritable memory card, at least until the memory card's OTP memory 40 is fully consumed. So, for example, if the host device 10 overwrites a sector of data with different data (which is often done for rewritable memory cards for a variety of reasons), the memory card 20 accepts and performs the requested write operation. (Because the underlying memory device 40 is OTP in this embodiment, memory on the device 40 itself cannot be changed after being written, but the card 20 firmware can automatically write updated data to a new location in memory and "remap" the old location to the new location. This remapping functionality is similar to the remapping that occurs in firmware in existing flash memory devices (see, for example, U.S. Pat. No. 7,139,864, which is hereby incorporated by reference).) This "overwrite" behavior ensures that there are minimal changes that the host device 10 must make to support the OTP memory card 20. The host device 10 can use any file system (most use the industry-standard FAT file system) and can still perform all the operations that it does for rewritable memory cards, including file rename, change, and delete operations, for example.

Figure 3:
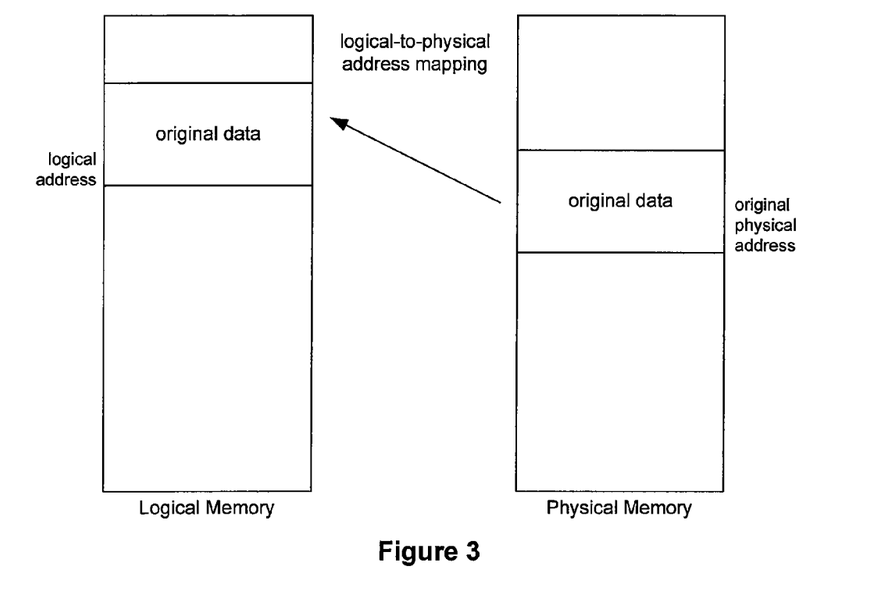
FIGS. 3 and 4 are illustrations of how a controller of a memory device of an embodiment makes logical memory appear rewritable even though the underlying memory is one-time programmable.
Figure 4:
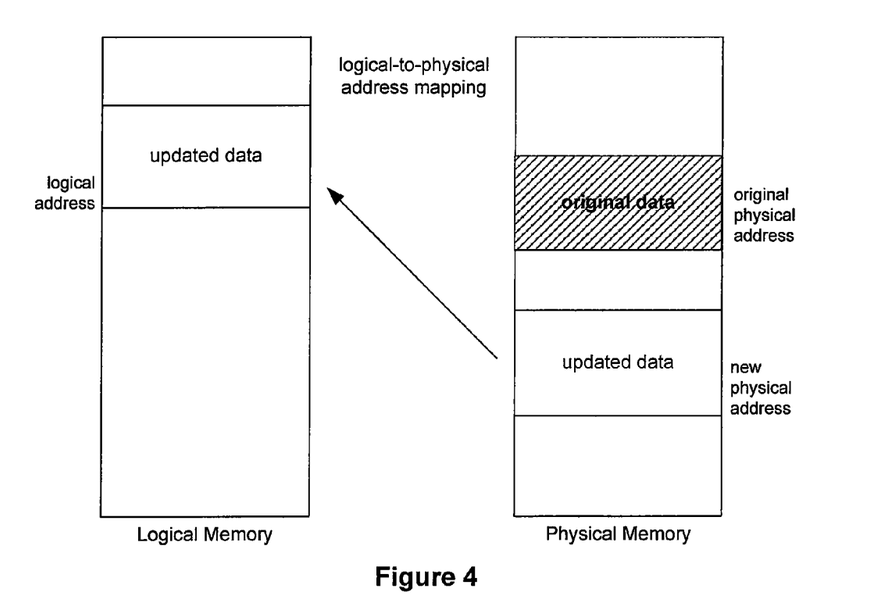

With reference again to FIG. 1, the host device 10 interfaces to the memory card 20 using logical addresses, the controller 30 acts as the interface between the host device 10 and the physical memory device(s) 40 and performs logical-to-physical addressing. The interface between the controller 30 and the memory device(s) 40 uses physical addresses. This interface implementation is standard to existing flash memory devices (see, for example, U.S. Pat. No. 7,139,864, which is hereby incorporated by reference). FIGS. 3 and 4 demonstrate how the controller 30 makes the logical memory appear rewritable even though the underlying memory 40 is OTP. FIG. 3 shows that original data stored at a logical address is stored in a physical location within the memory device 30. FIG. 4 shows that when the host device 10 overwrites the data at the logical address, the new updated data is stored at a new physical address, and the controller 30 updates its logical-to-physical addressing to reference the updated data instead of the now super-ceded original data. Again, the process is similar to the existing flash memory device implementation noted above; however, a difference between this embodiment and the flash implementation is that the memory 40 in this implementation (here, OTP) is not erased and re-used.

In its writable mode, the memory card 20 implements a new command (Read_Mem_Remaining) for the host device 10 to track the amount of physical (OTP) memory remaining. (The command code was allocated and defined in the SD Part 1 Physical Layer Specification, version 2.00, section 4.3.12 Command System as part of the switch command protocol, but the data values and format was defined specifically for the OTP card application.) The following table lists the values returned by the Read_Mem_Remaining, in a presently preferred embodiment (of course, other implementations can be used). Values are preferably returned in most-significant-byte, most-significant-bit order.

| Byte Position | Parameter | Description |
| --- | --- | --- |
| 511:508 | Main Area Remaining | Amount of memory remaining in the "main" area of the card. Reported in units of sectors (200 h bytes). |
| 507:504 | Reserve Area Remaining | Amount of memory remaining in the "main" area of the card. Reported in units of sectors (200 h bytes). |

By making the host device 10 responsible for tracking memory consumption, the memory card 20 definition avoids the problem with the original OTP card implementation, where the card tries to discern what the host device is doing and why. With this new definition, the memory card 20 is free to accept and perform all write operations, since only enabled host devices will be able to write to it, and they are responsible for tracking memory consumption and avoiding illegal operations.

In this embodiment, the first two values returned by the new command ("main" and "reserve") report to the host device 10 the amount of physical space remaining on the card 20 (1) for general/unspecified uses (file data and file system operations) (the "main area") and (2) that is reserved for file system operations only (no file data) (the "reserved area"). The main value was defined so that the host device 10 can use it the same way it currently uses the FAT tables: to both determine how many more files (or, more generally, how much more data) can be written to the card 20 and to decide when the card 20 is full and the host device 10 should stop writing data to the card 20. The reserve value was defined so that the host device 10 would always be able to perform the file-system related operations necessary to complete a file that had been in progress when the card 20 was completely consumed (as reported by the main area), in the same way as it does for the FAT file system structures. This minimizes the changes a host device 10 must make in order to support OTP cards in addition to rewritable cards.

Figure 5:
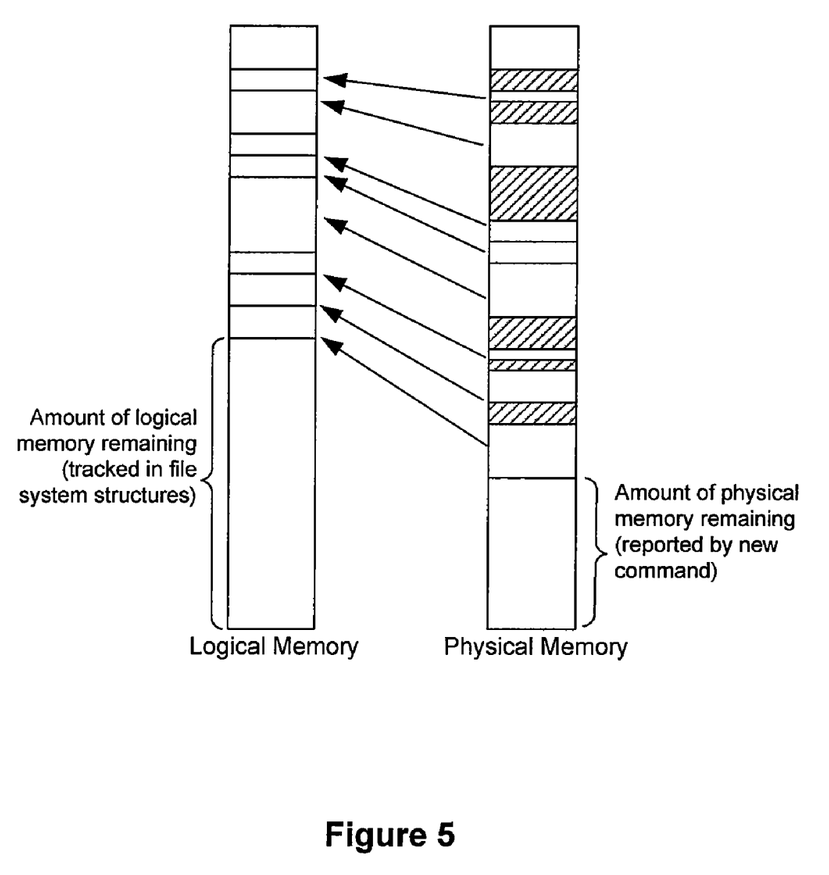
FIG. 5 is an illustration of a relationship between logical memory and physical memory of an embodiment.

FIG. 5 illustrates the relationship between logical memory (visible to the host device 10) and the physical memory 40 (not directly visible to the host device 10). The amount of unused logical memory is tracked by file system structures, typically a "File Allocation Tables" for the standard FAT file system. The controller 30 in the memory card 20 manages logical-to-physical addressing. Overwritten data, which is represented is this diagram by cross-hatches, is no longer referenced but still consumes physical memory. The controller 30 reports the amount of physical memory remaining using a new command, so the host device can determine the amount of space available. The amount of physical memory remaining may be smaller or larger than the amount of logical memory remaining.

In this embodiment, the behavior of "Program_CSD" and "Lock_Unlock" commands are also modified to reflect the fact that the card memory 40 is OTP and not rewritable. That is, these commands are preferably used only once to update/program the related registers. The Card Status Defaults (CSD) register reports the card's 20 operating conditions and supported commands and features. It also includes a small number of writable bits that are used to indicate the card's 20 write protect status and if the card 20 is original data or is a copy. These bits can only be set once, collectively; if any bits are changed by issuing the Program_CSD command, then the command can not be used again to further update the CSD register. The Lock_Unlock command is used to both set the card 20 password and to supply the password to later unlock the card 20. For the OTP card 20, the password can only be set once and, once set, can never be changed or cleared. If the password has been set, then this has implications on the future behavior of the card 20 as required by the SD specifications. Also, the OTP card 20 preferably does not support the "force erase" operation described in the SD specifications, where if the password is forgotten, the card 20 can be completely erased (clearing the password), because the OTP card 20 does not support the erase operation. Specifying that these two registers can be changed only once each achieves two purposes. First, it fixes the amount of space the card 20 must reserve in order to store the update register value, and, second, it allows the host device 10 to determine if the register has already been changed or not (if the register does not match its default value, it must have been modified, and since it has been modified, it may not be modified again). This would obviously not be true if the host device 10 could change the register values more than one time.

As noted above, the examples described herein are only some of the many implementations these embodiments can take. Also, while the use of OTP memory was used in these examples, it should be noted that the teachings described herein can also be applied to FTP memories. Further, although the memory card 20 in these embodiments took the form of an SD card, as mentioned above, any suitable type of memory device can be used, including, but not limited to, those in compliance with MultiMedia, Memory Stick, Compact Flash, Smart Media, xD, USB, or HS-MMC specifications.

As another alternative, the above embodiments can be modified to add features to prevent accidental or deliberate overwrites, changes, or deletions to existing data in a write-once, read-many (WORM) memory device. Preferably, these features are implemented in firmware logic and algorithms and do not rely on any particular memory type. Accordingly, a WORM memory card can be built using either one-time programmable (OTP), few-time programmable (FTP), or read/write memory devices, and can be built using standard two-dimensional flash memory or three-dimensional memory. (More generally, any of the embodiments described herein, including the OTP embodiments described above, can be built using any type of memory (e.g., OTP or rewritable) because, in these embodiments, it is the controller that makes a card "OTP" or "WORM" and not the underlying memory.)

In general, a WORM card is designed for OEM/industrial applications where data reliability and security are paramount, such as when storing digital still images, video images, and audio recordings used for police evidence; point-of-sale receipts for tax collection purposes; and long-term storage of financial records. For these and other applications, the WORM card's ability to ensure the integrity and safety of data written to the card is its primary attribute. Accordingly, features that prevent accidental or deliberate overwrites, changes, or deletions to existing data are desired. This embodiment uses some of the features of the OTP embodiment described above while adding additional features. Specifically, like the OTP card, the WORM card of this embodiment:

Powers-up in a read-only mode, compatible with the defined "ROM" SD memory card type, and readable in existing SD-compliant host devices.

Requires the host device to switch the card into a different mode (here, a read/write WORM mode, which is different from the OTP mode used in the OTP card); the WORM mode implements additional features noted below to ensure data integrity.

Implements a similar command as the OTP card for the host device to track physical memory consumption.

Behaves in a similar manner as the OTP card for the Program_CSD and Lock/Unlock commands.

However, the WORM card of this embodiment implements new features to ensure that data can be added to the card but not changed or deleted after being written. Specifically, the WORM card of this embodiment:

Implements new write "filters" that analyze write commands issued by the host device to determine if the write should be performed or not.

Implements a new command in WORM mode for the host device to designate writes as either "open" or "closed." This feature is used along with the write filters to ensure data is not changed after being written.

In one presently preferred embodiment, the implementation of the WORM card follows the same card architecture as other SD card products. Namely, the controller 30 implements the features and algorithms of the card 20 and acts as the interface between the host device 10 and the internal memory device(s) 40, as illustrated in FIG. 1. As noted above, the WORM card does not require any particular memory technology and can be built with OTP, FTP, or read/write memory, for example.

Figure 6:
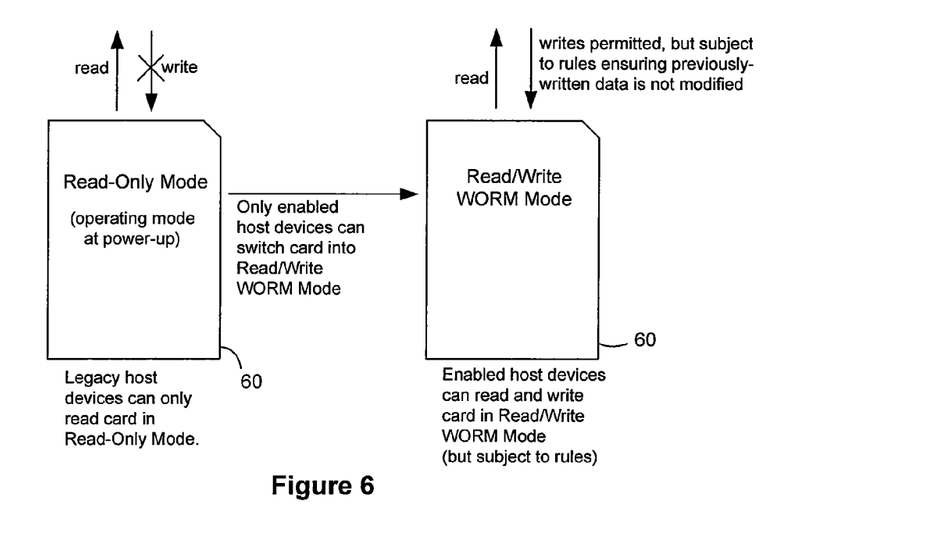
FIG. 6 is an illustration of a dual-mode behavior of a write-once read-many (WORM) memory device of an embodiment.

As shown in FIG. 6, like the OTP card 20 described above, the WORM card 60 in this embodiment implements two modes of operation, where it powers up in a ROM mode, readable by compliant SD host devices, and must be switched into a writable mode before writes can be performed. However, unlike the OTP card 20 described above, the WORM card 60 is switched into a "WORM" mode (instead of an "OTP" mode), which can be performed using the same command but a different argument. In WORM mode, the card 60 implements features to ensure that data can be added to the card 60 but not changed afterward.

Internally, after write commands are accepted by the card 60 (and not rejected by the write filters the card 60 implements to ensure that data is not changed after being written), the card 60 operates similar to the OTP card 20 described above and updates internal data structures for writes that update existing sectors of data. If the underlying memory device(s) are read/write, the now-superceded "original data" sectors may be erased and re-used. If the underlying memory device(s) are OTP, the updated data sectors will never be re-used and will simply never be referenced or accessed again.

The WORM card 60 preferably implements the same Read_Mem_Remaining command as the OTP card 20 for the host to track physical memory consumption. Also, the WORM card's 60 behavior with the Program_CSD and Lock_Unlock commands is preferably the same as the OTP card 20 implementation described above. However, the WORM card 60 preferably implements a new command for the host to mark write operations as either "open" or "closed." This information is used in conjunction with the write filters described below to ensure that data cannot be changed or deleted after being written. (The command code was allocated and defined in the SD Part 1 Physical Layer Specification, version 2.00, section 4.3.12 Command System as part of the switch command protocol, but the data values and format was defined specifically for the WORM card application.) In one embodiment, the host uses this command by specifying either an argument of 01h for "open" or 02h for "closed." Once set, the mode is "sticky" and is not changed until the command is issued again. When the card 60 is first switched into WORM mode, the write mode defaults to "open."

In this embodiment, the WORM card 60 uses the FAT file system to organize files and directories written to the card 60. (This is the file system recommended by the SD specifications, in Part 2 File System Specification.) As was noted in the OTP card description above, a host device that uses the FAT file system will often issue write operations overwriting existing data in the course of performing normal file-system operations. In this embodiment, the WORM card 60 requires the host device to make changes to its FAT file system implementation to satisfy the WORM card data overwrite requirements, but there are some FAT file system operations that overwrite existing data that the WORM card 60 must still support in order to be generally compatible with the FAT file system. Therefore, in this embodiment, the WORM card 60 preferably implements write filters to analyze write commands issued by the host and determine which are legal and should be performed and which are illegal and should be rejected. At a high level, the WORM card 60 allows write operations that are related to adding or creating new files or directories but rejects write operations that change already-written data. The rejected write operations include, for example, those that change file data, such as overwriting, deleting, or appending data to a completed file, as well as those that change a file's (or directory's) file entry, such as renaming the file entry, deleting the file entry (or marking it "deleted," a different operation), changing its attributes (read-only, archive, etc.), or changing the creation or last-modified date and time stamps, and other similar operations.

Figure 7:
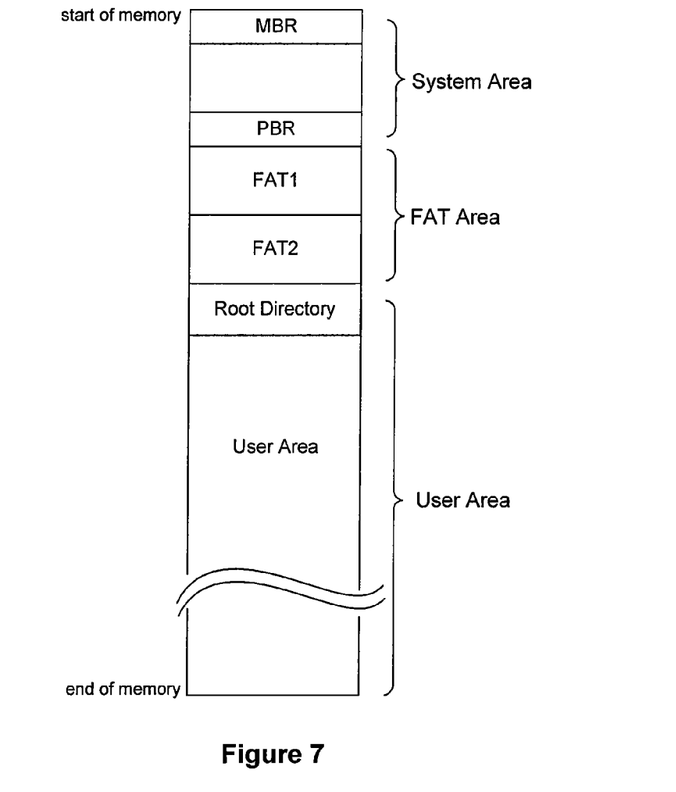
FIG. 7 is an illustration of a logical memory of a write-once read-many (WORM) memory device of an embodiment.

To support the write filters, the WORM card 60 preferably divides its logical memory into three regions, as shown in FIG. 7. The System Area begins at the "Master Boot Record" structure, located at the beginning of memory (logical address 00h), up to and including the "Partition Boot Record" structure. The FAT Area consists of the two copies of the File Allocation Tables and is located immediately after the System Area. The User Area consists of the remainder of the card's memory, beginning at the Root Directory, immediately after the second FAT, up to the end of the card's logical memory. The addresses of the FAT file system structures which mark boundaries between the various regions can be determined by decoding the structures, beginning with the MBR, which is located at logical address 00h.

In this embodiment, the WORM card 60 implements write rules to ensure that data cannot be modified after it has been written. These rules analyze every write command, on a sector-by-sector basis, to determine if each sector should be written as requested by the host. The write rules preferably use three pieces of information when determining if a write should be allowed or rejected: the location of the write operation (System Area, FAT Area, or User Area), whether that sector had been previously written and if it had been written "open" or "closed," and the data pattern the host is attempting to write.

In one presently preferred embodiment, the write rules implemented by the WORM card 60 are as follows:

No writes are allowed to the System Area, whether open or closed.

Writes to the FAT area can only change unprogrammed cluster entries. Programmed cluster entries cannot be changed to any value, including 0000h (the unprogrammed value). Cluster entries are two-byte values aligned on even byte addresses; if any bit of a cluster entry is non-zero, then that cluster entry is considered programmed and cannot be changed.

In one presently preferred embodiment, writes to the User Area are subject to the following rules:

Data can only be modified in multiples of 32-byte quantities (the size of a directory entry), aligned on 32-byte addresses. If any bit of a 32-byte group is non-zero, then that 32-byte group is considered programmed and cannot be changed.

If a sector (512 bytes) has been previously written with any non-zero data, additional data to that sector can only be appended (written after) in programmed 32-byte quantities. If a sector has one or more 32-byte quantities previously programmed such that there is a "gap" of one or more 32-byte quantities that are unprogrammed (all 00h values), then those intervening blank 32-byte quantities cannot be programmed.

If a sector has previously been written "closed" then that sector can never be written to again, regardless of the location or data pattern requested by the host.

If the host violates any of these rules, the card will return a Write Protection Violation error.

Of course, the above rules are merely examples, and other rules can be used. For example, the rule that data can only be modified in multiples of 32-byte quantities may be unnecessarily restrictive in some embodiments, and it may be better to allow updates to previously-programmed 32-byte quantities if those 32-byte quantities had left the "starting cluster" and/or "file length" fields blank and only to update those fields and not any others. This modification would make it easier for host devices to support a WORM card because they would have to make fewer changes to their existing FAT file system implementation. As another example, the rule that data can only be appended in 32-byte quantities may be unnecessary if the WORM card relies on the host device to properly follow the rules. For a host device that follows the recommended implementation, this situation should not arise.

In addition, note that the above rules describe a preferred embodiment to support a "FAT16" FAT file system; similar rules can be developed for FAT12, FAT32, and exFAT file systems, which are also commonly used for memory devices.

The WORM card 60 preferably requires the host device to modify its FAT file system implementation to satisfy the write rules. The WORM card 60 preferably requires the host device to write the file data (the data a file contains, as opposed to file-system related data such as the file name) as a "closed" write; by doing this, the file data can never be changed, regardless of the contents of the file. If the host does not write the file data as "closed," and the file data contained one or more blank sectors (all 00h values), then a malicious device could corrupt the file by changing that sector such that some of the 00h values were changed to other values. The file-system related information should be written "open" because those sectors might later be updated, since a sector might contain information on more than one file.

As mentioned above and in U.S. patent application Ser. Nos. 12/421,229 and 12/421,238, which are hereby incorporated by reference, WORM memory devices can be used to store data in archival situations where data integrity is critical, such as when storing digital evidence or other types of court-admissible content, national security information, insurance records, confidential information, and voting machine data, for example. In such situations, it is important for the user to be sure that a WORM memory device will function as expected and maintain data integrity. To provide such assurance, before a host is allowed to store data in a memory device, the memory device is first authenticated. This ensures that the memory device is coming from a trusted source and is not a counterfeit device, which may potentially delete or alter critical data, either by intent or by accident. This authentication can take place only once per memory device (e.g., a one-time registration), every time a host is attempting to store data in the memory device (e.g., authentication required every session), or at any other desired interval. While any suitable technique for authenticating a memory device can be used, the following paragraphs provide some exemplary techniques.

In one embodiment, the WORM memory device is pre-loaded with a security key (or, more generally, "security information," which can be any information used to authenticate the memory device), and the memory device is authenticated if the security key appears on a list of authorized security keys. A security key can take any suitable form and can be unique to the memory device (e.g., randomly generated by the controller) or to a batch of memory devices. The security key can be stored in any suitable location in the memory device and, in one embodiment, is stored in a hidden area to prevent the key from being accessed by unauthorized entities. In this embodiment, before the controller of the memory device initializes and enters an operational mode, a host must first register the memory device by validating the security key against a list of security keys. This list may be stored on the host or on a connected server. In case of a connected server, the host doing the validating is preferably connected to the server, e.g., via the Internet, during validation in order to access the most up-to-date list of security keys. If the memory device's security key is on the list, the memory device is put into operational mode. This can occur in any suitable manner. For example, in one embodiment, upon validating the security key, a host can automatically register the memory device by setting a flag in the memory device, which would unlock the memory device, allowing it to enter into its operational mode. In another embodiment, a human inspector (e.g., a person with credentialed password access to oversee the authentication process) manually sets this flag. In yet another embodiment, instead of setting a flag in the memory device to put it into its operational mode, the memory device is manufactured in an operational mode, and a human inspector simply separates those memory devices that are authenticated from those that are not, such that only authenticated memory devices are distributed. This "chain of custody" provides that desired assurance of an authenticated memory device. Validation can also be based on visual inspection, confirming authenticity of the supply channel, or electronically comparing the memory device to a master "gold copy." Irrespective of the particular method used, the above techniques ensure that a WORM memory device will function as advertised.

For additional security, in addition to authenticating the security key, one or more values can also be authenticated along with the security key before the memory device is considered authentic. These additional values can take any suitable form, such as, but not limited to, a time stamp or a memory device identifier (e.g., a serial ID of the memory device). These additional values can also be validated by the same list that validates the security key, or another list can be used. For added security, the security key and/or one or more of the additional values can be encrypted using a predetermined key, with the host decrypting these encrypted elements before validating them.

Figure 8:
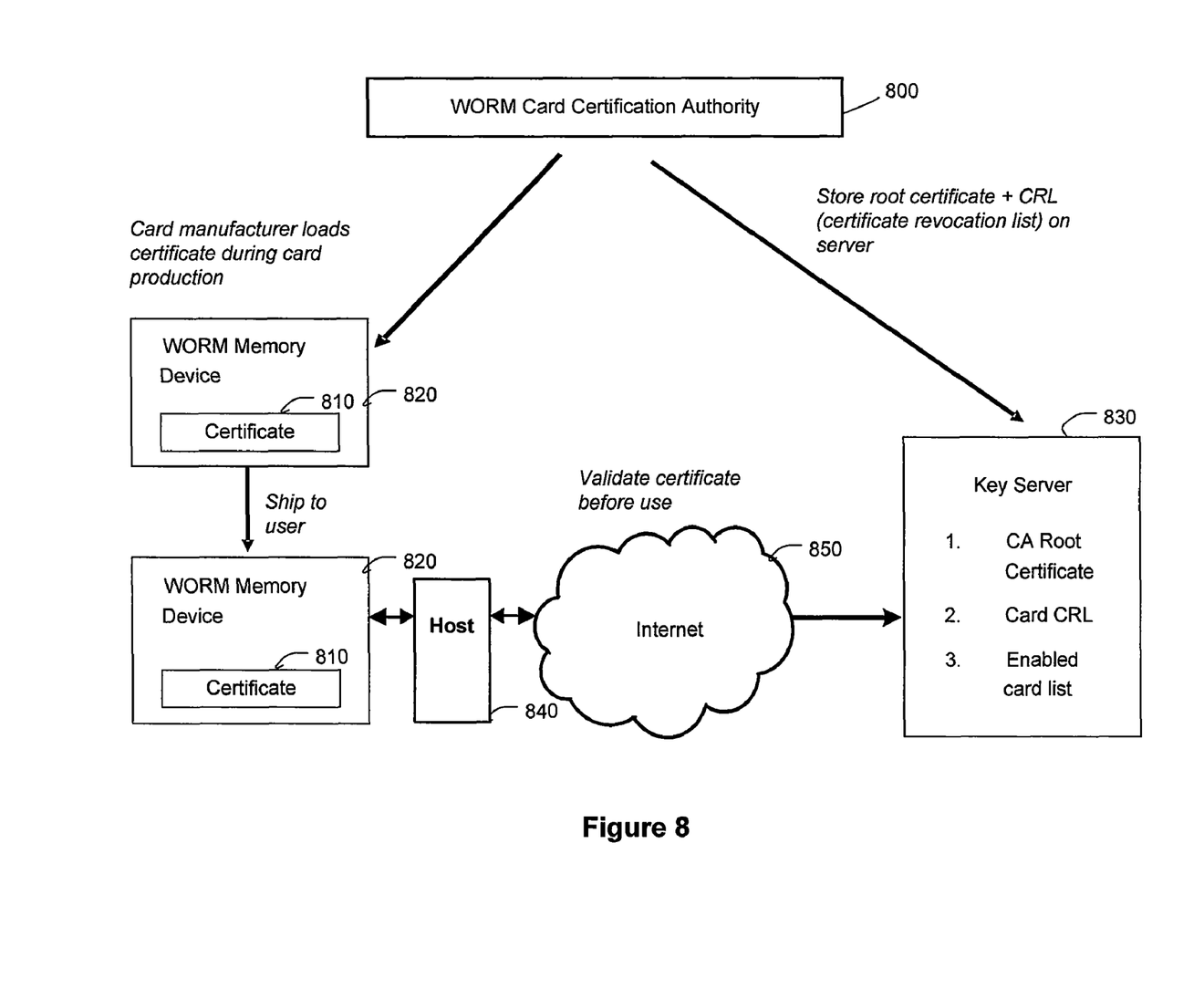
FIG. 8 is an illustration of a memory device of an embodiment being authenticated by a remote key server.
Figure 9:
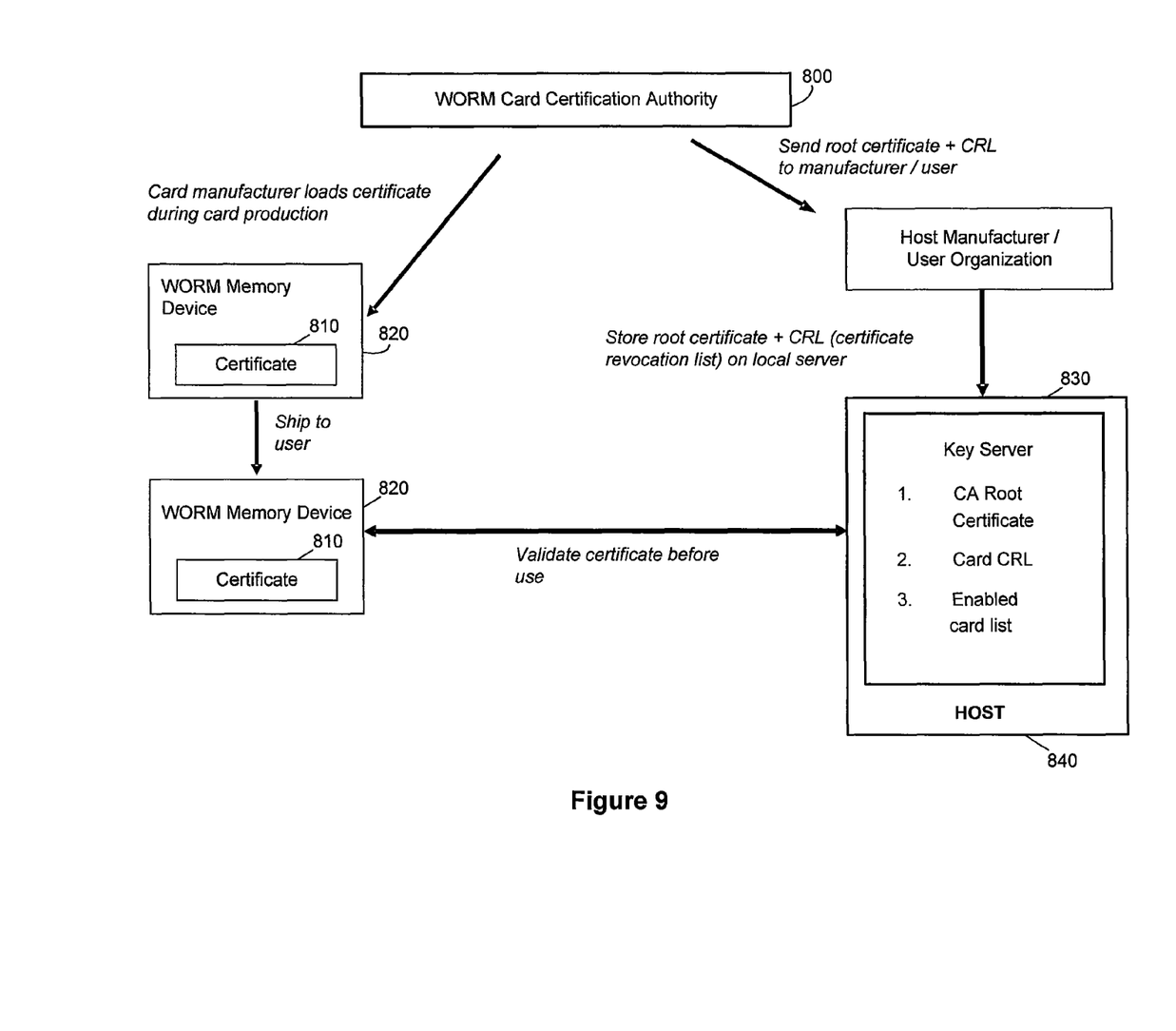
FIG. 9 is an illustration of a memory device of an embodiment being authenticated by a local key server.

Without intending to be a limitation on the claims, in one presently-preferred embodiment, the authentication method uses an RSA (or equivalent, such as ECC) asymmetrical protocol and a certificate plus key pair on a WORM memory device to authenticate the WORM memory device through a key server. This example is shown in FIGS. 8 and 9. In both FIGS. 8 and 9, a WORM Card Certification Authority (CA) 800 issues a security certificate 810 for a WORM memory device 820 (or for a batch of WORM memory devices). The root certificate for the CA, along with a certificate revocation list (CRL), which is used to identify revoked certificates, is stored on a key server 830. This same certificate 810, along with a private key pair (not shown), is stored on the WORM memory device 820 during production. Before initializing the WORM memory device 820 for usage, the certificate on the memory device 820 is validated against the certificate and CRL on the key server 830. The key server 830 can keep a list of valid memory devices that have been enabled through this process.

In FIG. 8, the key server 830 is remote from the host 840 and is accessed by the host 840 via a network, such as the Internet 850, in order to access the most up-to-date list of certificates and CRLs. In this situation, the host 840 can identify and authenticate the key server 830 through a secured connection. In contrast, in FIG. 9, the key server 830 is part of the host 840. In this situation, the key server 830 is a trusted local server, and server authentication is not required, as memory authentication may be done locally. The host/local server can be a PC or digital camera, for example. It should be noted that other key server arrangements can be used. For example, the key server can be located within an intranet of an organization, separate from the host.

Figure 10:
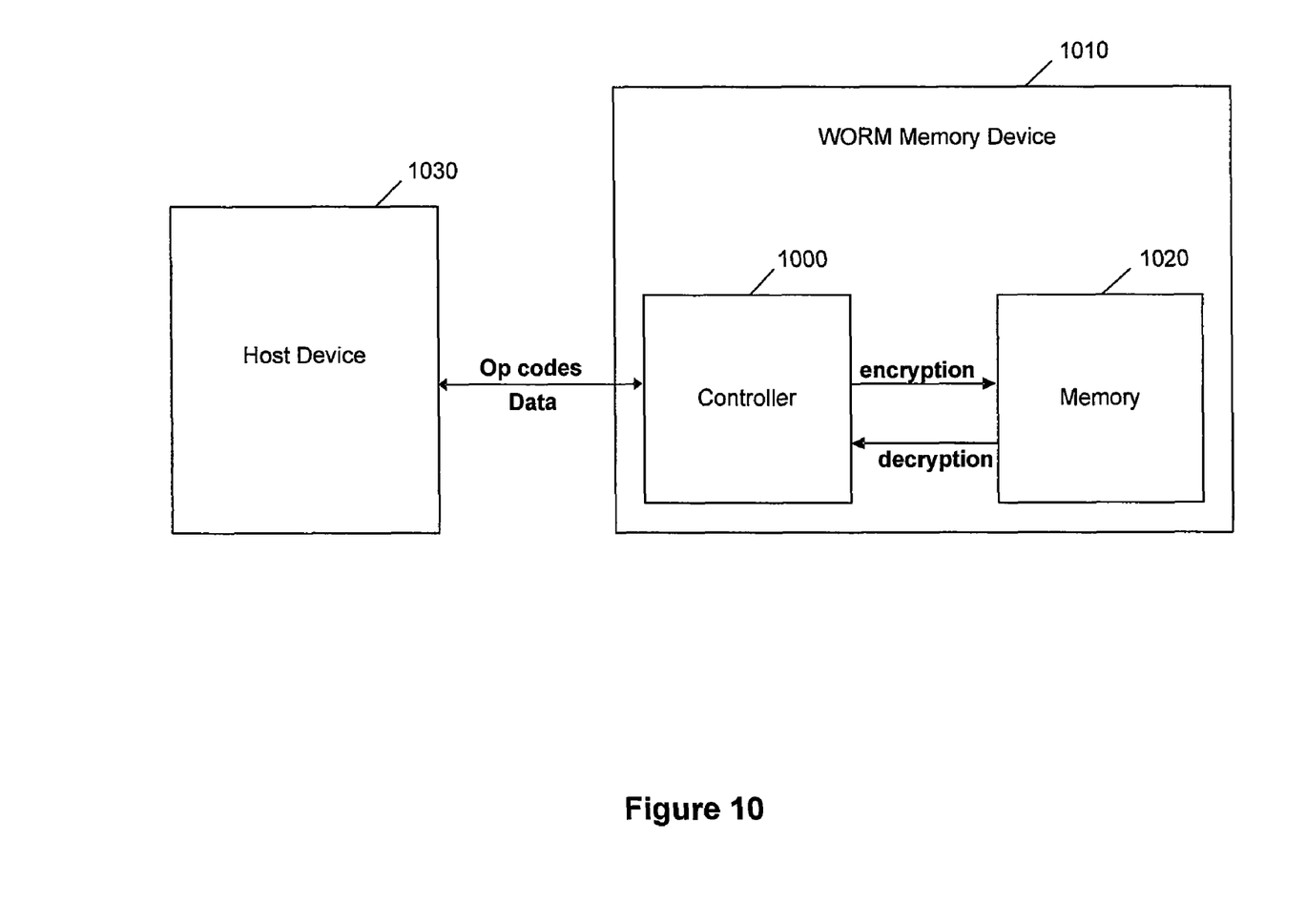
FIG. 10 is an illustration of a host device communicating with a memory device of an embodiment having encryption/decryption functionality.

Turning now to another embodiment, data that is stored on a WORM memory device can be highly sensitive and confidential. As such, it may be desired to implement one or more security features on the WORM memory device to maintain the integrity and confidentiality of stored data. With reference to FIG. 10, a controller 1000 of a WORM memory device 1010 can operate in a storage mode in which the controller 1000 encrypts data as the data is written to the memory 1020 and will only provide decrypted data to a host 1030 that has provided the appropriate credentials. Any encryption method can be used. In one embodiment, the WORM memory device 1010 uses a hardware encryption method. For example, the controller 1000 in the WORM memory device 1010 can use the hardware encryption methods described in U.S. Patent Application Publication Nos. 2006/0242064 and 2008/0010685, which are hereby incorporated by reference herein. Alternatively, the WORM memory device 1010 can use software encryption methods or a combination of hardware and software encryption methods. Examples of suitable encryption techniques that can be used include, but are not limited to, AES, DES, 3DES, PKI, SHA-1 Hash, RSA, and random number generation. In one presently preferred embodiment, the memory device 1010 uses a TrustedFlash™ security platform from SanDisk Corporation. Various forms of encryption can be available for use, and the host can set the encryption type during the authentication of the card. This may be useful in situations where an organization may want all their cards to be operating in a certain mode, and they can ensure this by setting it during the authentication process. In this case, they would have appropriate hosts that are set to write data in that mode as well.

Figure 11:
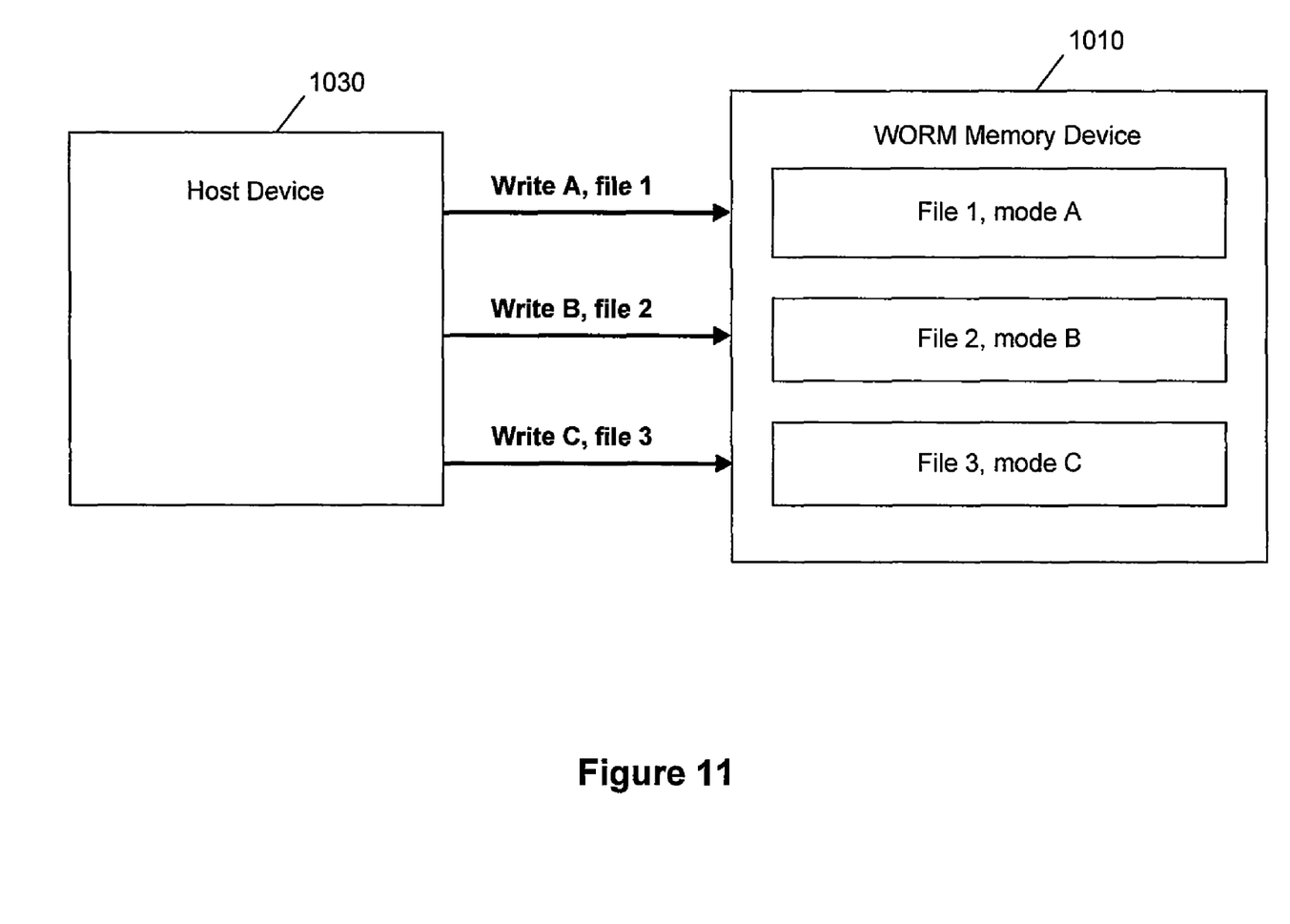
FIG. 11 is an illustration of a host device writing data to a memory device of an embodiment.
Figure 12A:
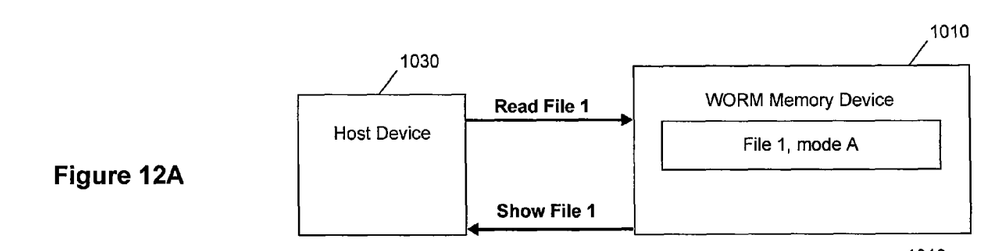
FIGS. 12A, 12B, and 12C are illustrations of a host device reading data from a memory device of an embodiment.
Figure 12B:
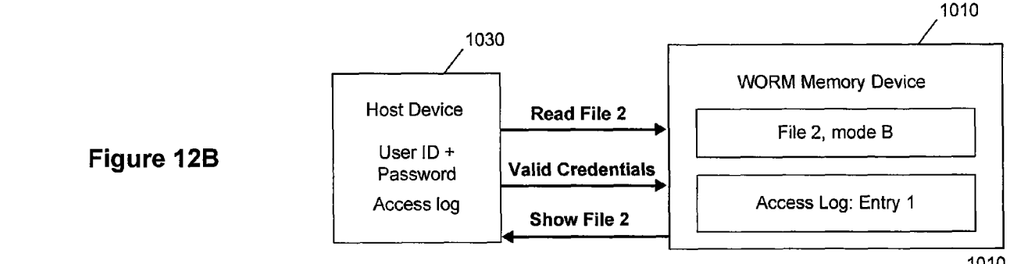

The controller 1000 of the memory device 1010 can also be operative to implement several storage modes, where the host 1030 can provide the memory device 1010 with a command (e.g., an op code) to select one of these modes. This allows the host 1030 to decide what mode best fits a given application usage model. For example, FIG. 11 shows the host device 1030 sending three different op codes ("Write A," "Write B," "Write C") for three different files ("file 1," "file 2," "file 3"). In response to these op codes, the WORM memory device 1010 stores the files using their respective storage modes. So, as shown in FIG. 11, the file 1 would be stored using storage mode A, file 2 would be stored using storage mode B, and file 3 would be stored in storage mode C. Of course, fewer (even one) or more storage modes can be used. Although the various storage modes can have any desired characteristics, FIGS. 12A-12C illustrate three particular storage modes of an embodiment. Storage mode A (FIG. 12A) is an unsecured mode. Accordingly, when the host device 1030 sends a command to the WORM memory device 1010 to read (or, more generally, "access" (e.g., read or copy)) a file (here, file 1) that was stored using storage mode A, the WORM memory device 1010 simply provides file 1 to the host device 1030. That is, in this mode, no security is required, and the WORM memory device 1010 will allow open access to the file. Storage mode B (FIG. 12B) is a standard security mode, with a password required to read a file (here, file 2) that was stored using storage mode B. As illustrated in FIG. 12B, to read file 2, the host device 1030 sends both a command to read file 2, as well as valid credentials (here, a user ID and password). The WORM memory device 1010 checks those credentials against a stored list of valid credentials and, if there is a match, provides file 2 to the host device 1030. The WORM memory device 1010 can keep an access log of attempts (successful or not) to read file 2 and can provide such log to an authenticated host device 1030. The access log can include data, such as, but not limited to, user ID, user password, and time and date stamps, for the purposes of keeping accurate records. In another implementation of storage mode B, the host already has a valid key to access the card; however, the system (e.g., a program running on a PC) requires the user to input a valid user ID and password before allowing the host to access the card. This would be a sort of "local authentication," where it is up to the organization to control access within their walls.

Figure 12C:
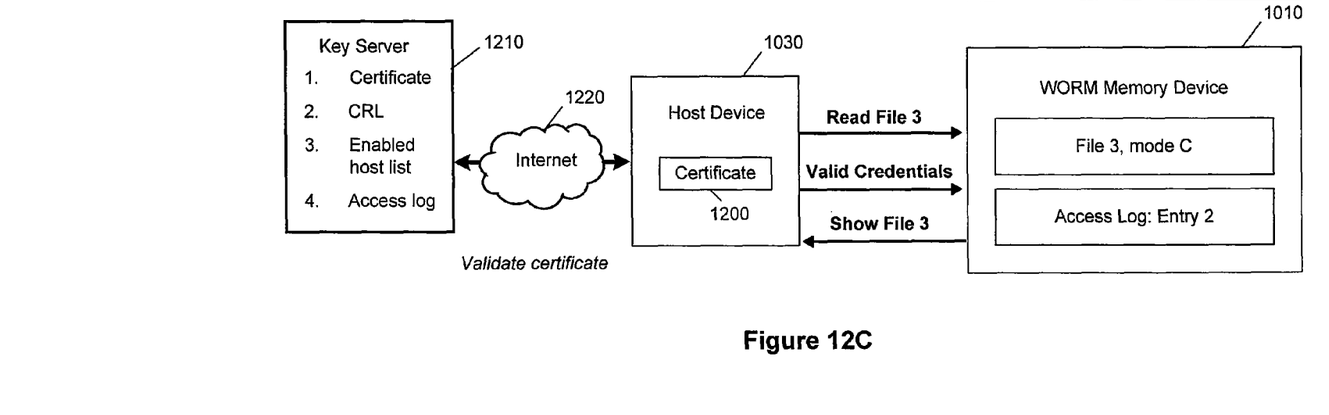

Lastly, storage mode C (FIG. 12C) is a high security mode, which requires the host device 1030 to be connected to a key server 1210 (e.g., via the Internet 1220) in order to validate a certificate 1200 (or, more generally, a user ID and an access key) stored on the host device 1030. This level of security can ensure that a host device attempting to access data in the WORM memory device 1010 is a currently-authenticated host. In this embodiment, a WORM Host Certificate Authority provides the certificate 1200 to the host device 1010. The WORM Host Certificate Authority also stores the certificate and a certificate revocation list (CRL) on the key server 1210. When the host device 1030 wants to read a file (here, file 3) stored using storage mode C, the host device 1030 first presents its certificate to the key server 1210 for validation. If the certificate 1200 matches the one on the key server 1210 and is not on the CRL, the key server 1210 will validate the certificate 1200 and provide the host device 1030 with valid credentials. When the host device 1030 presents these valid credentials to the WORM memory device 1010 along with a request to read file 3, the WORM memory device 1010 allows the host device 1030 to read file 3. As with storage mode B, the WORM memory device 1010 can keep an access log of attempts to read a file. The key server 1210 can also keep an access log of attempts to validate certificates, as well as a list of enabled host devices.

After a file has been written to the WORM memory device 1010 using a certain storage mode, that file (and/or other files stored in the WORM memory device 1010) can be set to a higher security level. For example, a file written using storage mode A can be set by an authenticated host to storage mode B, and a file written using storage mode B can be set to storage mode C. However, it may be preferred to prevent a file from being set to a lower storage mode (e.g., a storage mode C file should not be set to storage mode A). One usage example is when a camera host captures an image. The camera host may write the image using storage mode A to allow the user to review the image on the camera's display device. However, after reviewing the image, the user may decide to then "secure" the image on the WORM memory device and, therefore, switch that image (and perhaps other images on the WORM memory device) to storage mode C, at which point read access is only granted to an authenticated host. In another implementation of storage mode C, the certificate on the host must be authenticated with a remote key server first, after which the system (e.g., a program running on a PC) requires the user to input a valid user ID and password before allowing the host to access the card. The key server can be in any suitable location, such as, but not limited to, on a local intranet separate from the host.

These embodiments provide several advantages over prior storage techniques. For example, while analog media, such as film and cassette tapes, can be used to store critical data, such as evidence, in an unalterable state, analog media is harder to replicate than digital media (e.g., flash memory), as the data must be converted to a digital format to be stored and distributed electronically. While the original analog media can be kept for archival purposes, outside of locking the analog media in an external enclosure to physically limit access to the data, it is difficult to keep the data confidential and difficult to track the access history. Further, analog media is becoming rare and is being phased out by most manufacturers, making analog media hard to find. Also, when traditional flash media devices, such as standard SD cards or CF cards, are used to store sensitive data, often, a strict chain of custody process for the cards is needed to ensure that the data stored therein is not altered in any way during the handling of the cards since traditional flash media devices can be altered. The security features discussed above can be used to address these concerns, as the functionality of ensuring that the stored data is not altered is built-in to the WORM memory device itself. Also, by using the registration features discussed above, a user can be assured that the WORM memory device is legitimate and will support any specialized command from the host needed to implement the WORM functionality.

Other alternatives can be used. For example, to keep the WORM memory device tamperproof, test pads that can provide direct access to the memory can be removed from the memory device's substrate during production of the memory device.

Finally, as noted above, the memory used in these embodiments can take any suitable form, as it is the controller (e.g., pure hardware, or hardware running firmware or software) that enforces the write-once, read-many nature of the memory device. Accordingly, the memory can be one-time programmable, few-time programmable, or re-writable (e.g., NAND). In the case of a re-writable memory, using the controller to limit the number of writes (to as low as one write) can provide longer data retention. Also, as noted above, in one embodiment, the memory device works in accordance with the SDA standard and uses standard SD commands from the SDA physical layer specification, along with some additional WORM-specific commands. While the memory device has an SD card form factor in that embodiment, it should be noted that other form factors can be used.

Some of the following claims may state that a component is operative to perform a certain function or is configured for a certain task. It should be noted that these are not restrictive limitations. It should also be noted that the acts recited in the claims can be performed in any order—not necessarily in the order in which they are recited. Also, it is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A memory device comprising:
   a memory storing security information; and
   a controller in communication with the memory, wherein the controller is operative to:
      place the memory device in an operational state only after a host device validates the stored security information; and
      after the memory device is in the operational state:
         power-up in read-only mode;
         receive a command from the host device to switch to a write-once, read-many (WORM) mode;
         in response to the command from the host device, switch from the read-only mode to the WORM mode; and
         while in the WORM mode:
            receive a write command from the host device; and
            determine if the write command should be performed.

2. The memory device of claim 1, wherein the stored security information is unique to the memory device.

3. The memory device of claim 1, wherein the stored security information is unique to a batch of memory devices that includes the memory device.

4. The memory device of claim 1, wherein information used to validate the stored security information is stored on the host device.

5. The memory device of claim 1, wherein information used to validate the stored security information is stored on a server in communication with the host device.

6. The memory device of claim 1, wherein the stored security information comprises an RSA certificate, and wherein information used to validate the RSA certificate comprises a certificate authority root certificate and a certificate revocation list.

7. The memory device of claim 1, wherein, after the stored security information is validated, a flag is stored in the memory device to place the memory device in the operational state.

8. The memory device of claim 1, wherein the stored security information is stored in a hidden area in the memory device.

9. The memory device of claim 1, wherein the memory device is placed in the operational state after the stored security information is validated and after at least one additional item is validated.

10. The memory device of claim 9, wherein the at least one additional item comprises a time stamp or an identifier of the memory device.

11. The memory device of claim 9, wherein at least one of the stored security information and the at least one additional item is encrypted.

12. The memory device of claim 1, wherein the stored security information is automatically validated by the host device.

13. The memory device of claim 12, wherein the host device is operated by an authorized user.

14. The memory device of claim 1, wherein the memory comprises NAND.

15. A method for authenticated a memory device, the method comprising:
performing the following with a memory device comprising a controller:
receiving a request from a host in communication with the memory device for security information stored in the memory device;
sending the security information to the host;
if the security information is validated receiving information from the host that places the memory device in an operational state; and
after the memory device is in the operational state:
powering-up in read-only mode;
receiving a command from the host device to switch to a write-once, read-many (WORM) mode;
in response to the command from the host device, switching from the read-only mode to the WORM mode; and
while in the WORM mode:
receiving a write command from the host device; and
determining if the write command should be performed.

16. The method of claim 15, wherein the stored security information is unique to the memory device.

17. The method of claim 15, wherein the stored security information is unique to a batch of memory devices that includes the memory device.

18. The method of claim 15, wherein information used to validate the security information is stored on a server in communication with the host device.

19. The method of claim 15, wherein the security information comprises an RSA certificate, and wherein a certificate authority root certificate and a certificate revocation list are used to validate the RSA certificate.

20. The method of claim 15, wherein the information received from the host device that places the memory device in an operational state comprises a flag.

21. The method of claim 15, wherein the security information is stored in a hidden area in the memory device.

22. The method of claim 15 further comprising sending at least one additional item to the host device for validation, wherein the memory device receives the information from the host device that places the memory device in the operational state if both the security information and the at least one additional item are validated.

23. The method of claim 22, wherein the at least one additional item comprises a time stamp or an identifier of the memory device.

24. The method of claim 22, wherein at least one of the stored security information and the at least one additional item is encrypted.

25. The method of claim 15, wherein the stored security'information is automatically validated by the host device.

26. The method of claim 15, wherein the stored security information is validated by the host device, and wherein the host device is operated by an authorized user.

27. The method of claim 15, wherein the memory comprises NAND.

* * * * *